(12) United States Patent
Shannon et al.

(10) Patent No.: US 11,423,339 B2
(45) Date of Patent: Aug. 23, 2022

(54) COGNITIVE AUTOMATION PLATFORM FOR DYNAMIC RESOURCE MANAGEMENT AND CONTROL

(71) Applicant: Bank of America Corporation, Charlotte, NC (US)

(72) Inventors: Stephen T. Shannon, Charlotte, NC (US); Elena Kvochko, New York, NY (US); Jinna Kim, Charlotte, NC (US); Christine D. Black, Belfast, ME (US); Monika Kapur, Jacksonville, FL (US)

(73) Assignee: Bank of America Corporation, Charlotte, NC (US)

( * ) Notice: Subject to any disclaimer, the term of this patent is extended or adjusted under 35 U.S.C. 154(b) by 46 days.

(21) Appl. No.: 16/827,825

(22) Filed: Mar. 24, 2020

(65) Prior Publication Data

US 2021/0304088 A1    Sep. 30, 2021

(51) Int. Cl.
| | |
|---|---|
| *G06Q 10/06* | (2012.01) |
| *G06N 20/00* | (2019.01) |
| *G06F 9/50* | (2006.01) |

(52) U.S. Cl.
CPC ....... *G06Q 10/0631* (2013.01); *G06F 9/5011* (2013.01); *G06N 20/00* (2019.01)

(58) Field of Classification Search
None
See application file for complete search history.

(56) References Cited

U.S. PATENT DOCUMENTS

| | | | |
|---|---|---|---|
| 10,019,769 B1 * | 7/2018 | Hodge | G06Q 50/26 |
| 10,601,683 B1 * | 3/2020 | Kulshreshtha | G06F 9/5061 |
| 2014/0350989 A1 * | 11/2014 | Telatar | G06Q 10/1097 705/7.21 |
| 2016/0065589 A1 * | 3/2016 | Leighton | H04W 4/029 726/4 |
| 2016/0306075 A1 * | 10/2016 | Heng | G06Q 10/06315 |
| 2016/0350787 A1 * | 12/2016 | Taylor | G06Q 30/0223 |
| 2019/0244149 A1 | 8/2019 | Krishnaswamy | |
| 2021/0185477 A1 * | 6/2021 | Gorsica | H04M 1/7243 |

* cited by examiner

*Primary Examiner* — Alan Torrico-Lopez
(74) *Attorney, Agent, or Firm* — Banner & Witcoff, Ltd.

(57) ABSTRACT

Systems for using cognitive automation techniques to generate resource recommendations are provided. In some examples, current resource data may be received. The current resource data may include current staffing data, skills associated with current staff, and the like. In some examples, environmental condition data may also be received. The environmental condition data may include current weather information, predicted weather information, power outage information, and the like. The resource data and environmental data may be analyzed using cognitive automation techniques to identify and/or generate one or more resource recommendations. The resource recommendations may include adjustments to staffing, modification of locations at which processes are performed, and the like. The identified or generated recommendations may be transmitted to one or more computing devices. In some examples, feedback data may be received based on the recommendations and the cognitive automation model may be updated and/or validated based on the feedback data.

12 Claims, 12 Drawing Sheets

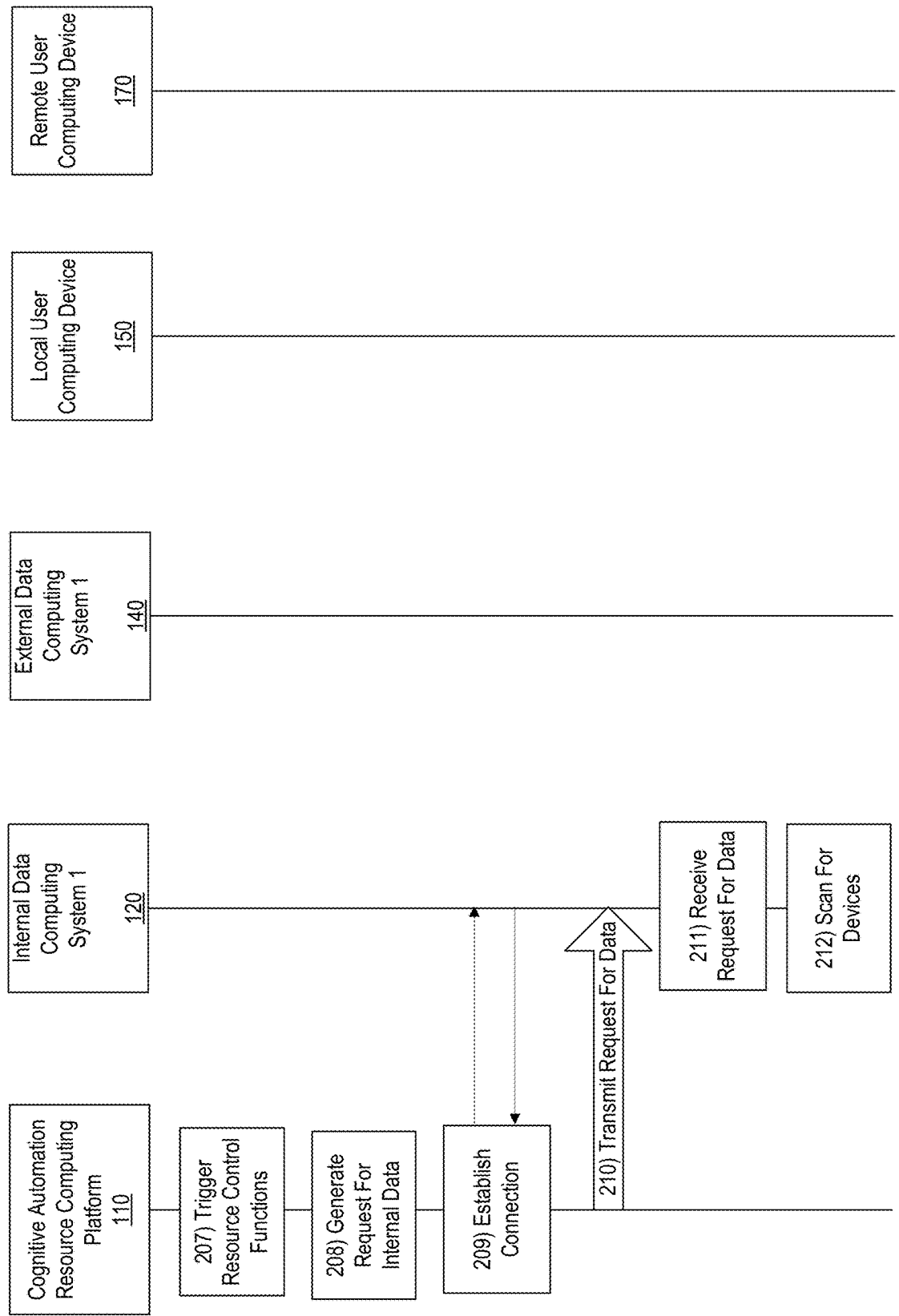

400

Resource Recommendation

Location 1 is likely to be short staffed today and tomorrow.
Call in additional staff Feedback  OK

Your Location is Short Staffed

Can you come into work?

Yes

COGNITIVE AUTOMATION PLATFORM FOR DYNAMIC RESOURCE MANAGEMENT AND CONTROL

BACKGROUND

Aspects of the disclosure relate to electrical computers, systems, and devices for dynamic resource management and generation functions based on cognitive automation.

Large scale enterprises often have many locations throughout various geographic locations. In order to ensure efficient operation of these locations, resource management is an important function. However, conventional systems often do not have the capacity to account for multiple, changing factors in determining resource levels. Accordingly, it may be advantageous to use cognitive automation techniques to optimize resource management.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure provide effective, efficient, scalable, and convenient technical solutions that address and overcome the technical problems associated with generating resource management and control functions.

In some examples, current resource data may be received. The current resource data may include current staffing data, skills associated with current staff, and the like. In some examples, environmental condition data may also be received. The environmental condition data may include current weather information, predicted weather information, power outage information, and the like. In some arrangements, the resource data and environmental data may be analyzed using cognitive automation techniques to identify and/or generate one or more resource recommendations. The resource recommendations may include adjustments to staffing, modification of locations at which processes are performed, and the like.

The identified or generated recommendations may be transmitted to one or more computing devices. For instance, the generated recommendations may be transmitted to an entity computing device for display and/or execution. Additionally or alternatively, the recommendations may be transmitted to one or more user computing devices. In some examples, feedback data may be received based on the recommendations and the cognitive automation model may be updated and/or validated based on the feedback data.

In doing so, various technical advantages may be realized. For example, one technical advantage of using cognitive automation in generating resource recommendations is that such techniques may expedite computing methods corresponding to recommendations. Specifically, this approach may prevent users from spending time repeatedly working through a decision tree to identify appropriate recommendations to provide. The systems and methods described herein may conserve network bandwidth by reducing back and forth communication between local user devices, remote user devices, computing platforms, and the like.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2F depict an illustrative event sequence for implementing dynamic resource management and control functions in accordance with one or more aspects described herein;

FIG. 4 illustrates one example user interface including a recommendation generated according to one or more aspects described herein;

FIG. 5 illustrates another example user interface including a recommendation generated according to one or more aspects described herein;

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As discussed above, large enterprise organizations often have to manage resources in order to efficiently provide services to users. However, understanding optimal resource distribution and executing actions to achieve that distribution can be difficult. Accordingly, arrangements described herein provide resource manage and control functions using cognitive automation techniques. In some examples, data from various sources may be received. For instance, data from internal sources, such as current staffing levels, expected staffing levels, minimum staffing levels, computing resource locations, and the like, may be received. Further, data from external sources may be received. For instance, weather data, wide spread illness data, power outage data, and the like may be received (e.g., from publicly available sources). In some examples, artificial intelligence may be used to analyze the data and generate or identify one or more resource recommendations. The resource recommendations may include modifications to resource levels within an entity location, modification of resource distribution between entity locations, and the like. The resource recommendations may be transmitted to one or more computing devices for execution.

These and various other arrangements will be discussed more fully below.

Figure 1A:
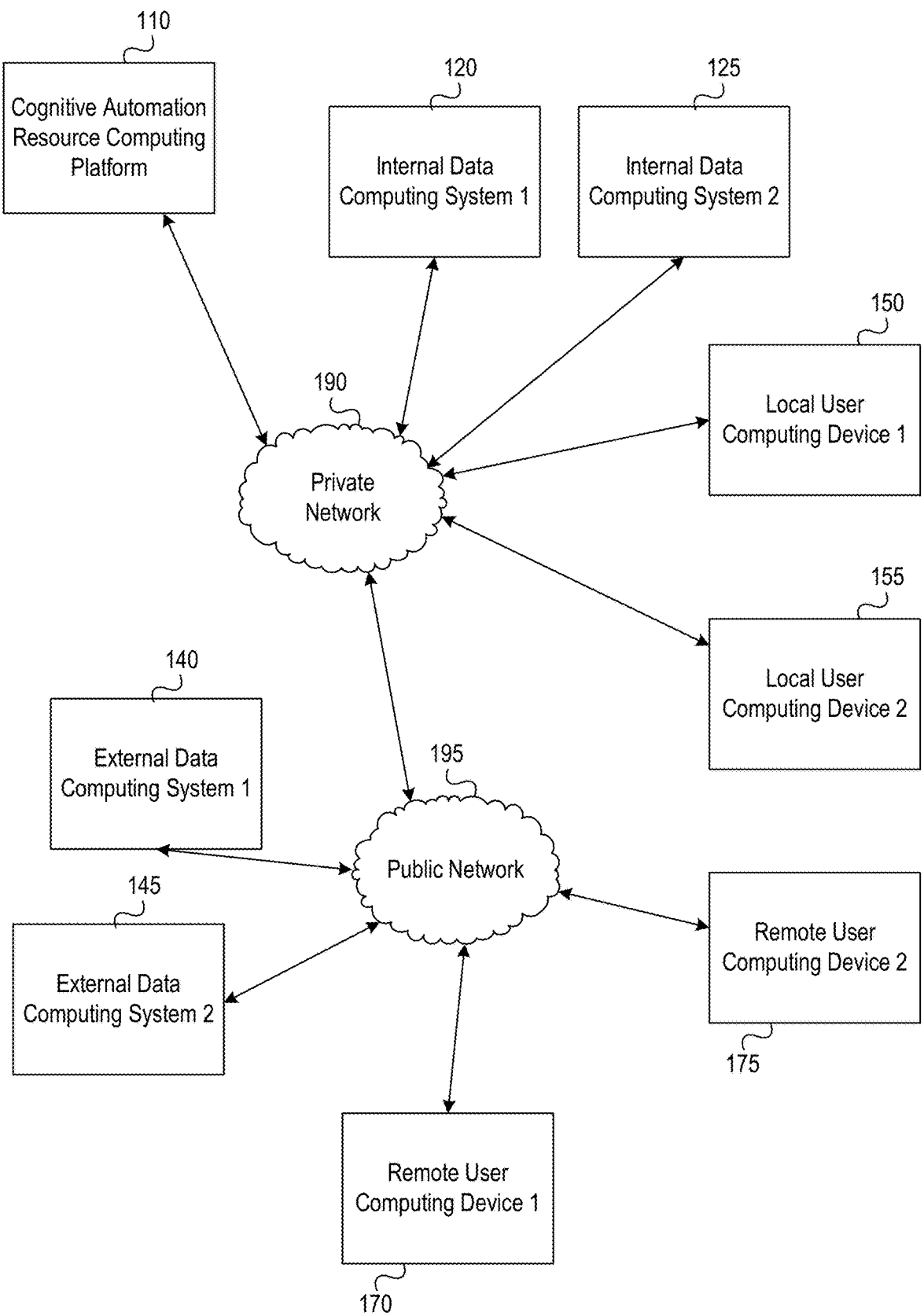
FIGS. 1A and 1B depict an illustrative computing environment for implementing dynamic resource management and control functions in accordance with one or more aspects described herein.
Figure 1B:
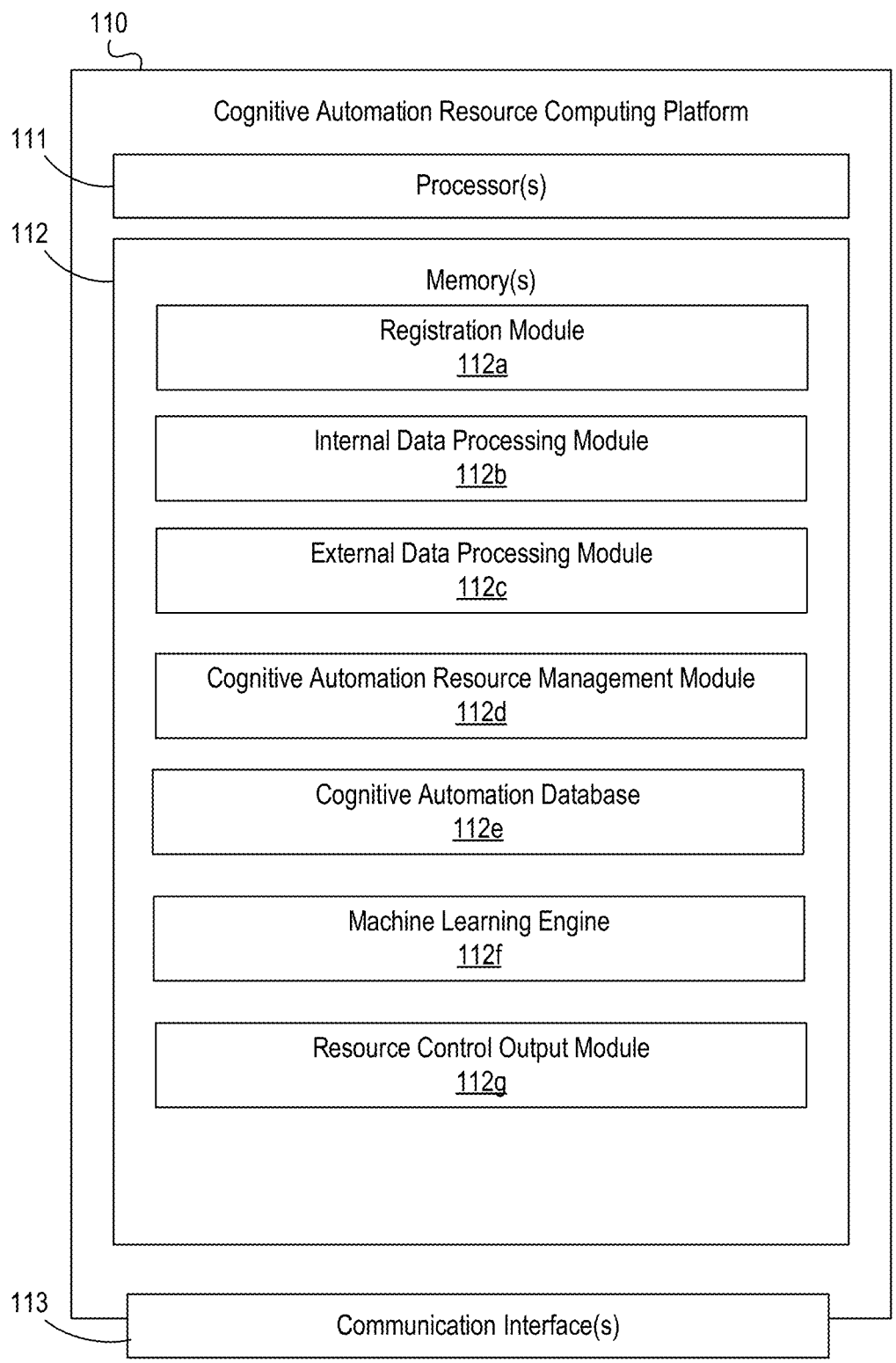

FIGS. 1A-1B depict an illustrative computing environment for implementing and using cognitive automation techniques for resource management and control in accordance with one or more aspects described herein. Referring to FIG. 1A, computing environment 100 may include one or more computing devices and/or other computing systems. For example, computing environment 100 may include cognitive automation resource computing platform 110, internal data computing system 1 120, internal data computing system 2 125, external data computing system 1 140, external data computing system 2 145, a first local user computing device 150, a second local user computing device 155, a first remote user computing device 170, and a second remote user computing device 175. Although two internal computing systems 120, 125 and two external data computing systems 140, 145 are shown, more or fewer entity computing devices may be used without departing from the invention.

Cognitive automation resource computing platform 110 may be configured to provide intelligent, dynamic, resource management and control functions based on cognitive automation technique. Cognitive automation resource computing platform 110 may be a computer system that includes one or more computing devices (e.g., servers, server blades, or the like) and/or other computer components (e.g., processors, memories, communication interfaces) that may be used to implement cognitive automation, machine learning algorithms, artificial intelligence, or the like to recognize patterns and generate resource recommendations or other mitigating actions (e.g., staffing, computing resource, location resource, and the like). In some instances, the cognitive automation resource computing platform 110 may be maintained by an enterprise organization (e.g., a financial institution, or the like) and may receive data from one or more sources, such as internal data computing device 1 120, internal data computing device 2 125, external data computing device 1 140, external data computing device 2 145, and may analyze the data using, for instance, cognitive automation to analyze and predict resource needs, generate resource allocation recommendations, and the like. For instance, data such as internal staffing data may be received. The internal staffing data may include expected absences, staff who are present (e.g., as detected via a computing system wearable device of the user (e.g., remote user computing device), location beacon, or the like. Further, publicly available information may be received, such as anticipated weather issues or natural disasters, current or expected power outages, or the like. The information may be analyzed and one or more resource allocation predictions may be generated (e.g., using cognitive automation). The predictions may include recommended staff for staffing (e.g., identification of sufficient number, staff with particular skill sets, or the like) to be requested, identification of a need to close a location and shift resources to a secondary location, identification of an appropriate secondary location, and the like.

In addition, the cognitive automation resource computing platform 110 may receive other resource data and generate recommendations based on the data. For instance, the cognitive automation resource computing platform 110 may receive staff evaluations and may generate recommended messaging, improvements, or the like, to be delivered to the user. In some examples, career path recommendations may be generated for users including end goals, intermediate steps, and the like. The recommendations may be based on data received and analyzed using cognitive automation.

In some instances, the cognitive automation resource computing platform 110 may be configured to maintain a cognitive automation model that stores correlations between user absence, environmental conditions, user behaviors, and the like, and may be configured to update the cognitive automation model based on received feedback.

Internal data computing system 1 120 and internal data computing system 2 125 may be computing devices suitable for hosting and/or executing one or more applications associated with an entity implementing the cognitive automation resource computing platform 110. In some examples, internal data computing system 1 120 and internal data computing system 2 125 may include databases storing data associated with resources of the entity (e.g., computing resources, staffing resources, skills sets associated with workers or staff, and the like). In some examples, internal data computing system 1 120 and/or internal data computing system 2 125 may host or execute one or more applications for detecting a presence of a user at a location, for receiving indications that a user is present or not present at a location, and the like. Further, internal data computing system 1 120 and/or internal data computing system 2 125 may store data related to necessary staffing capacity for one or more entity locations in one or more geographic regions (e.g., number of people needed to staff a location in various circumstances).

External data computing system 1 140 and external data computing system 2 145 may be computing devices suitable for hosting and/or executing one or more applications external to the entity (e.g., publicly available or otherwise not associated with the entity). In some examples, external data computing system 1 140 and/or external data computing system 2 145 may include one or more databases storing publicly available information related to environmental conditions in one or more geographic areas, such as current weather conditions, anticipated weather conditions, anticipated natural disasters, and the like).

Internal data computing system 1 120, internal data computing system 2 125, external data computing system 1 140, and/or external data computing system 2 145 may each include one or more memories, processors, and the like, and may include computing devices configured to perform one or more functions described herein, such as a desktop, laptop, tablet, server, and the like.

Local user computing device 150, 155 and remote user computing device 170, 175 may be configured to communicate with and/or connect to one or more computing devices or systems shown in FIG. 1A. For instance, local user computing device 150, 155 may communicate with one or more computing systems or devices via network 190, while remote user computing device 170, 175 may communicate with one or more computing systems or devices via network 195. In some examples, local user computing device 150, 155 may be used to access the cognitive automation resource computing platform 110, internal data computing system 1 120, external data computing system 2 125, or the like to detect a presence or lack of presence of a user, receive an indication of a presence or absence of a user, generate user reviews, and the like.

In some examples, local user computing device 150 and/or local user computing device 155 may be configured to communicate with one or more remote user computing devices (e.g., remote user computing device 170, 175) to receive an indication of a presence or absence of a user (e.g., via multiple networks). Additionally or alternatively, local user computing device 150 and/or local user computing device 155 may be or include one or more location beacons configured to emit a signal that may be detected by, for instance, a mobile device of a user (e.g., remote user computing device 170, 175) to detect a presence of a user.

The remote user computing device 170 and remote user computing device 175 may be used to communicate with, for example, one or more systems, computing platforms, devices, or the like, to indicate a presence or absence of a user, detect current location and/or weather data, and the like. In some examples, remote user computing devices 170, 175 may include user computing devices, such as mobile devices including smartphones, wearable devices, smart watches, tablets, laptop computers, and the like, and/or desktop or other computing devices and data received from one remote user computing device 170 may be used to generate resource management and control recommendations.

Local user computing device 150, local user computing device 155, remote user computing device 170, and/or remote user computing device 175 may be configured to display and/or execute one or more resource recommendations or mitigating actions based on commands received from cognitive automation resource computing platform 110.

Computing environment 100 also may include one or more computing platforms. For example, and as noted above, computing environment 100 may include cognitive automation resource computing platform 110. As illustrated in greater detail below, cognitive automation resource computing platform 110 may include one or more computing devices configured to perform one or more of the functions described herein. For example, cognitive automation resource computing platform 110 may include one or more computers (e.g., laptop computers, desktop computers, servers, server blades, or the like).

As mentioned above, computing environment 100 also may include one or more networks, which may interconnect one or more of cognitive automation resource computing platform 110, internal data computing system 1 120, internal data computing system 2 125, external data computing system 1 140, external data computing system 2 145, local user computing device 150, local user computing device 155, remote user computing device 170, and/or remote user computing device 175. For example, computing environment 100 may include private network 190 and public network 195. Private network 190 and/or public network 195 may include one or more sub-networks (e.g., Local Area Networks (LANs), Wide Area Networks (WANs), or the like). Private network 190 may be associated with a particular organization (e.g., a corporation, financial institution, educational institution, governmental institution, or the like) and may interconnect one or more computing devices associated with the organization. For example, cognitive automation resource computing platform 110, internal data computing system 1 120, internal data computing system 2 125, local user computing device 150, and local user computing device 155, may be associated with an organization (e.g., a financial institution), and private network 190 may be associated with and/or operated by the organization, and may include one or more networks (e.g., LANs, WANs, virtual private networks (VPNs), or the like) that interconnect cognitive automation resource computing platform 110, internal data computing system 1 120, internal data computing system 2 125, local user computing device 150, local user computing device 155, and one or more other computing devices and/or computer systems that are used by, operated by, and/or otherwise associated with the organization. Public network 195 may connect private network 190 and/or one or more computing devices connected thereto (e.g., cognitive automation resource computing platform 110, internal data computing system 1 120, internal data computing system 2 125, local user computing device 150, local user computing device 155) with one or more networks and/or computing devices that are not associated with the organization. For example, external data computing system 1 140, external data computing system 2 145, remote user computing device 170, remote user computing device 175, might not be associated with an organization that operates private network 190 (e.g., because, external data computing system 1 140, external data computing system 2 145, remote user computing device 170, and/or remote user computing device 175, may be owned, operated, and/or serviced by one or more entities different from the organization that operates private network 190, one or more customers of the organization, one or more employees of the organization, public or government entities, and/or vendors of the organization, rather than being owned and/or operated by the organization itself), and public network 195 may include one or more networks (e.g., the internet) that connect, external data computing system 1 140, external data computing system 2 145, remote user computing device 170, and/or remote user computing device 175, to private network 190 and/or one or more computing devices connected thereto (e.g., cognitive automation resource computing platform 110, internal data computing system 1 120, internal data computing system 2 125, local user computing device 150, local user computing device 155).

Referring to FIG. 1B, cognitive automation resource computing platform 110 may include one or more processors 111, memory 112, and communication interface 113. A data bus may interconnect processor(s) 111, memory 112, and communication interface 113. Communication interface 113 may be a network interface configured to support communication between cognitive automation resource computing platform 110 and one or more networks (e.g., private network 190, public network 195, or the like). Memory 112 may include one or more program modules having instructions that when executed by processor(s) 111 cause cognitive automation resource computing platform 110 to perform one or more functions described herein and/or one or more databases that may store and/or otherwise maintain information which may be used by such program modules and/or processor(s) 111. In some instances, the one or more program modules and/or databases may be stored by and/or maintained in different memory units of cognitive automation resource computing platform 110 and/or by different computing devices that may form and/or otherwise make up cognitive automation resource computing platform 110.

For example, memory 112 may have, store and/or include a registration module 112a. Registration module may store instructions and/or data that may cause or enable the cognitive automation resource computing platform 110 to receive data related to one or more computing devices, systems, users, and the like. For instance, one or more users may register with the system and provide data associated with one or more mobile devices associated with the user, contact information, skill sets held by the user, and the like. In some examples, one or more computing systems (e.g., internal data computing system 1 120, internal data computing system 2 125, external data computing system 1 140, external data computing system 2 145) may be registered by providing unique identifying information associated with the systems, and the like.

Cognitive automation resource computing platform 110 may further have, store and/or include internal data processing module 112b. Internal data processing module 112b may store instructions and/or data that may cause or enable the cognitive automation resource computing platform 110 to receive internal data from one or more systems, such as internal data computing system 1 120, internal data computing system 2 125, and the like, and process the data. In some examples, the data may be processed using artificial intelligence, machine learning, cognitive automation, and the like. As discussed herein, internal data may include indications of a presence or absence of user or staff member at a particular location, may include anticipated needs at a particular location, desired skills to be present at a particular location, and the like.

Cognitive automation resource computing platform 110 may further have, store and/or include external data processing module 112c. External data processing module 112c may store instructions and/or data that may cause or enable the cognitive automation resource computing platform 110 to receive external data from one or more systems, such as external data computing system 1 420, external data computing system 2 145, and the like, and process the data. In some examples, the data may be processed using artificial intelligence, machine learning, cognitive automation, and the like. As discussed herein, external data may include current weather data, predicted weather conditions and/or emergencies, anticipated power outages, and the like.

Cognitive automation resource computing platform 110 may further have, store and/or include cognitive automation resource management module 112d. Cognitive automation resource management module 112d may store instructions and/or data that may cause or enable the cognitive automation resource computing platform 110 to to execute advanced cognitive automation techniques related to resource management and control, as discussed in greater detail below. Cognitive automation database 112e may store information used by cognitive automation module 112a and/or cognitive automation resource computing platform 110 in application of cognitive automation techniques related to resource recommendation generation and/or execution, and/or in performing other functions.

Cognitive automation resource computing platform 110 may further have, store and/or include a machine learning engine 112f and machine learning datasets. Machine learning engine 112f may store instructions and/or data that may cause or enable cognitive automation resource computing platform 110 to analyze data to identify patterns or sequences within resource data (e.g., internal staffing data, external environmental data, and the like) to identify one or more resource recommendations or mitigating actions (e.g., adjustments to staffing, modifying location of performance of one or more actions, and the like). The machine learning datasets may be generated based on analyzed data (e.g., data from previously received data, and the like), raw data, and/or received from one or more outside sources.

The machine learning engine 112f may receive data and, using one or more machine learning algorithms, may generate one or more machine learning datasets. Various machine learning algorithms may be used without departing from the invention, such as supervised learning algorithms, unsupervised learning algorithms, regression algorithms (e.g., linear regression, logistic regression, and the like), instance based algorithms (e.g., learning vector quantization, locally weighted learning, and the like), regularization algorithms (e.g., ridge regression, least-angle regression, and the like), decision tree algorithms, Bayesian algorithms, clustering algorithms, artificial neural network algorithms, and the like. Additional or alternative machine learning algorithms may be used without departing from the invention.

Cognitive automation resource computing platform 110 may further have, store and/or include resource control output module 112g. Resource control output module 112g may store instructions and/or data that may cause or enable the cognitive automation resource computing platform 110 to generate one or more recommendations or mitigating actions based on the processed data and transmit one or more notifications, instructions, commands, signals, or the like, to execute one or more recommendations. For instance, resource control output module 112g may generate one or more notifications that may be transmitted to one or more computing devices (e.g., local user computing device 150, local user computing device 155, remote user computing device 170, remote user computing device 175) for display. In some examples, the notifications may include interactive user interfaces.

Further the resource control output module 112g may generate and/or transmit one or more commands, instructions or signals to execute a generated recommendation. For instance, if analysis of data outputs a recommendation to move processing of one or more computing functions to an alternative location, set of computing devices, or the like, the resource control output module 112g may generate one or more commands or instructions causing the move and may transmit the commands and/or instructions to one or more computing devices for execution.

FIGS. 2A-2F depict one example illustrative event sequence for implementing and using cognitive automation techniques for resource management and control functions in accordance with one or more aspects described herein. The events shown in the illustrative event sequence are merely one example sequence and additional events may be added, or events may be omitted, without departing from the invention.

Figure 2A:
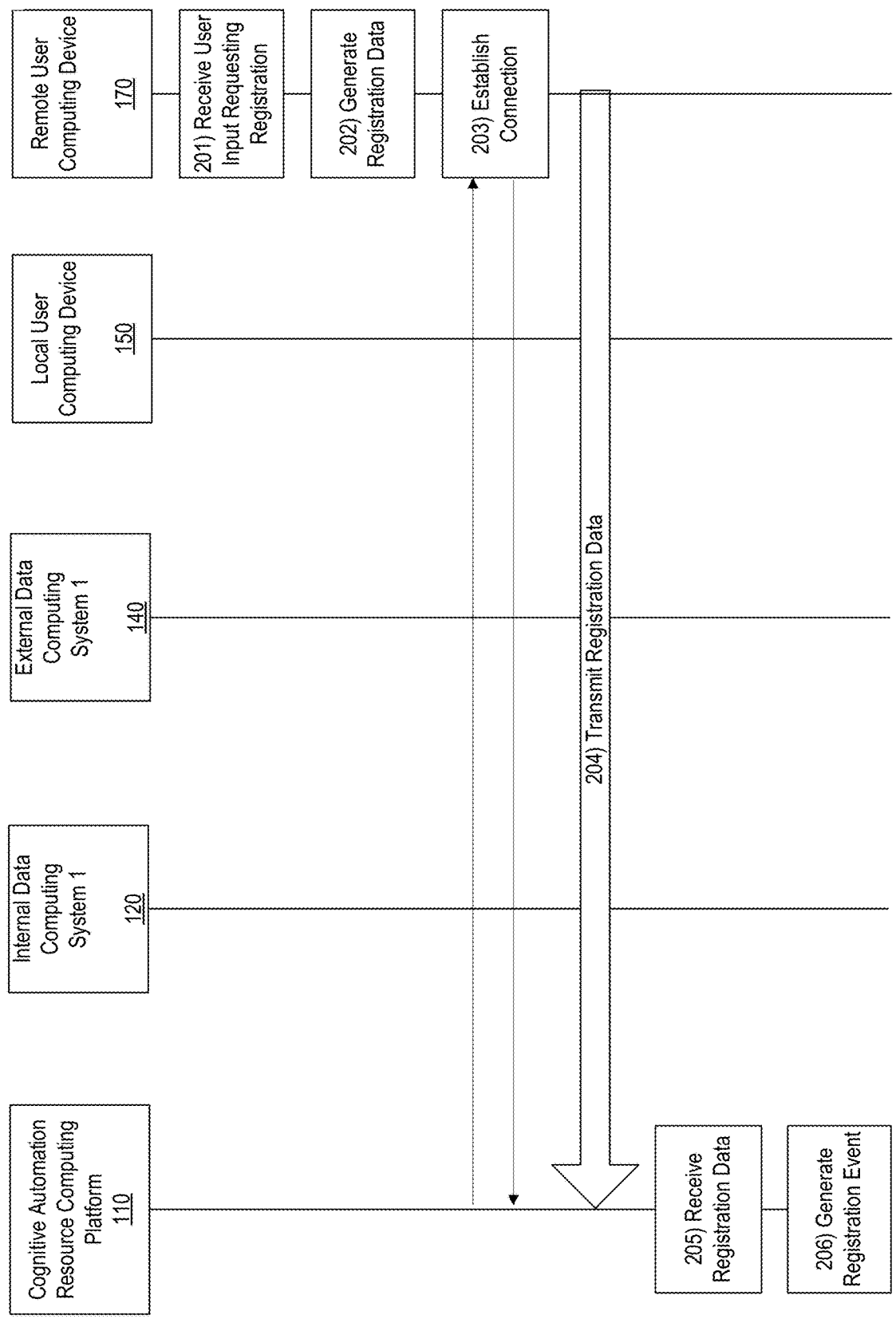

With reference to FIG. 2A, at step 201, user input requesting registration may be received. For instance, user input requesting registration of one or more computing systems, devices, users, or the like, may be received. The request for registration may include identification of the user, contact information of the user, skills associated with the user, computing devices associated with the user (e.g., smartphone, wearable device, or the like), and the like. Although FIG. 2A illustrates registration data being received from one remote user computing device 170, registration information may be received from a plurality of remote user computing devices, as well as local user computing devices, internal data computing systems, external data computing systems, and the like.

At step 202, registration data may be generated. For instance, data associated with the user, computing devices, or the like, being registered may be generated.

At step 203, a connection may be established between the remote user computing device 170 and the cognitive automation resource computing platform 110. For instance, a first wireless connection may be established between the cognitive automation resource computing platform 110 and remote user computing device 170. Upon establishing the first wireless connection, a communication session may be initiated between cognitive automation resource computing platform 110 and remote user computing device 170.

At step 204, the registration data may be transmitted from the remote user computing device 170 to the cognitive automation resource computing platform 110. In some examples, the registration data may be transmitted during the communication session initiated upon establishing the first wireless connection.

At step 205, the registration data may be received and, in some examples, one or more cognitive automation resource management and control functions or processes may be initiated and/or activated by the cognitive automation resource computing platform 110.

At step 206, responsive to receiving the registration data, a registration event may be generated. In some examples, the registration event may include storing registration information, initiating communication with one or more devices or systems, or the like.

With reference to FIG. 2B, at step 207, one or more resource management and control functions may be triggered. For instance, in some examples, at a predetermined time or day, the system may automatically trigger resource management and control functions in order to generate one or more resource management recommendations (e.g., to optimize staffing, move computing processes, and the like). Additionally or alternatively, user input may be received from one or more devices, such as local user computing device 150, remote user computing device 170, or the like, requesting resource management functions. In still other examples, one or more computing systems may initiate a connection with cognitive automation resource computing platform 110, which may trigger the resource management and control functions.

At step 208, a request for internal data may be generated. In some examples, the request for internal data may be generated in response to triggering the resource management and control functions and include a request for current staffing data at one or more geographic locations of an entity. For instance, an entity location, such as a bank branch, may initiate resource management functions at the start of each business day. In response, a request for internal data associated with which staff are currently present, who has indicated that they will be absent, historical data associated with expected staffing needs, and the like, may be generated.

At step 209, a connection may be established between the cognitive automation resource computing platform 110 and internal data computing system 1 120. For instance, a second wireless connection may be established between the cognitive automation resource computing platform 110 and internal data computing system 1 120. Upon establishing the second wireless connection, a communication session may be initiated between cognitive automation resource computing platform 110 and internal data computing system 1 120.

At step 210, the request for internal data may be transmitted from the cognitive automation resource computing platform 110 to the internal data computing system 1 120. For instance, the request for internal data may be transmitted during the communication session initiated upon establishing the second wireless connection.

At step 211, the request for internal data may be received by the internal data computing system 1 120 and executed. In some examples, the request for internal data may include one or more signals, instructions or commands to execute one or more functions to obtain or retrieve the desired data. For instance, the request for internal data may include an instruction, signal or command to execute a scan of a physical location within an entity location to detect user devices associated with staff or other users who are present at the time. In some examples, scanning for devices may include transmitting a signal that may be detected by one or more computing devices within a predetermine distance of the device emitting the signal.

At step 212, based on the executed request for internal data, internal data computing system 1 120 (or other device in communication with internal data computing system 1 120, such as one or more location beacons arranged at various positions within an entity location) may scan for devices within a predetermined range.

Figure 2C:
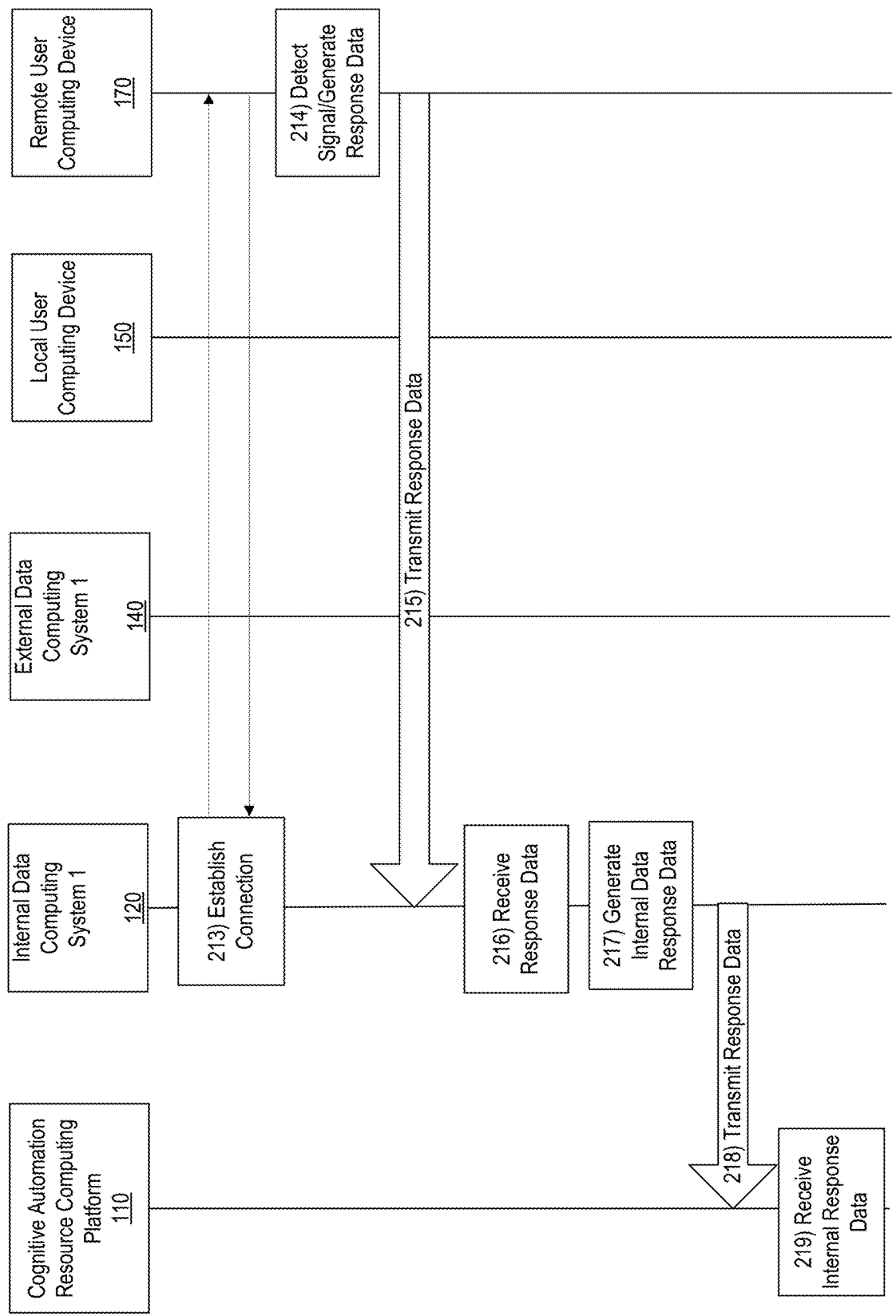

With reference to FIG. 2C, at step 213, in response to the scanning, a connection may be established between the internal data computing device 1 120 and remote user computing device 170. For instance, a third wireless connection may be established between the internal data computing system 1 120 and remote user computing device 170. Upon establishing the third wireless connection, a communication session may be initiated between internal data computing system 1 120 and remote user computing device 170.

At step 214, the emitted signal may be detected by the remote user computing device and response data may be generated. At step 215, the response data may be transmitted from the remote user computing device 170 to the internal data computing system 1 120. In some examples, the response data may be transmitted during the communication session initiated upon establishing the third wireless connection. In some arrangements, the response data may include metadata such as time, date, and the like, associated with the detected signal.

In continuing the example from above, one or more location beacons at a bank branch may emit a signal in order to identify one or more computing devices within a predetermined range of the beacon. In response, a mobile device, wearable device, or the like, of a staff member may detect the emitted signal, establish a connection with internal data computing system 1 120 and transmit an acknowledgement of the detected signal. This acknowledgement may then indicate that the staff member is present at the bank branch and, accordingly, staffing resource may be adjusted.

At step 216, the generated response data may be received from the remote user computing device 170. In some examples, response data may be received from a plurality of computing devices (e.g., computing devices associated with a plurality of employees).

At step 217, internal response data may be generated. In some examples, the internal response data may include an indication of a presence of one or more staff members (e.g., based on device scanning, on user input provided via a computing device (e.g., a user may clock in to work on a remote user computing device 170, or other device in communication with internal data computing system) and the like). Internal response data may also include data retrieved from one or more databases in internal data computing system 1 120 and/or other similar devices. For instance, data associated with expected needs at a particular entity location for a particular day, time, or the like, may be retrieved and provided in the internal response data. Additionally or alternatively, skill sets for users detected as present and/or users not detected as present but expected may be identified and provided. Various other information may be provided without departing from the invention.

Accordingly, a bank branch may generate internal response data including identification of staff or other users who were detected via scanning or otherwise indicated a presence, an indication of staff or other users who were expected but were not detected, any minimum skills desired for availability at the bank branch (e.g., speaker of multiple languages, users having experience in particular services or products available at the bank branch, or the like). This information may be compared to correlations stored by cognitive automation resource computing platform 110 (e.g., based on training data or other previously captured data) to generate one or more resource recommendations.

At step 218, the generated internal response data may be transmitted to the cognitive automation resource computing platform 110. For instance, the internal response data may be transmitted during the communication session initiated upon establishing the second wireless connection. Alternatively, a new connection may be established and another communication session may be initiated.

At step 219, the internal response data may be received by the cognitive automation resource computing platform 110.

Figure 2D:
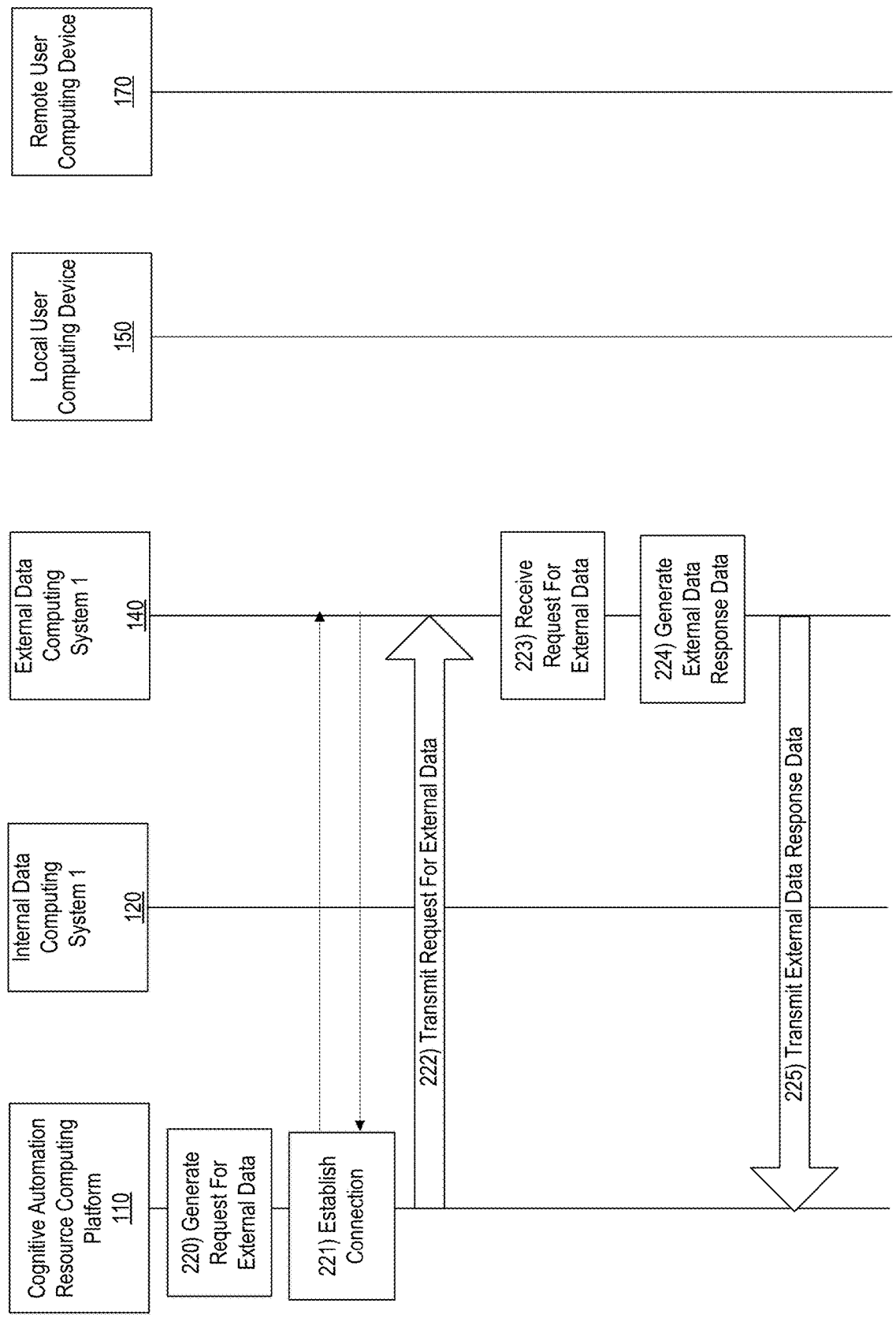

With reference to FIG. 2D, at step 220, a request for external data may be generated. In some examples, the request for external data may be generated in response to receiving the internal response data. In some arrangements, the request for external data may include one or more instructions, commands or signals to execute the request for external data, including retrieving data from one or more databases, one or more computing devices or systems in communication with another system, and the like.

At step 221, a connection may be established between the cognitive automation resource computing platform 110 and external data computing system 1 140. For instance, a fourth wireless connection may be established between the external data computing system 1 140 and cognitive automation resource computing platform 110. Upon establishing the fourth wireless connection, a communication session may be initiated between external data computing system 1 140 and cognitive automation resource computing platform 110.

At step 222, the request for external data may be transmitted from the cognitive automation resource computing platform 110 to the external data computing system 1 140. In some examples, the request for external data may be transmitted during the communication session initiated upon establishing the fourth wireless connection.

At step 223, the request for external data may be received and executed by the external data computing system 1 140. For instance, the request for external data may be received and requested data may be retrieved (e.g., from one or more databases, computing devices in communication with external data computing system 1 140, or the like). The requested external data may include data associated with environmental conditions in one or more geographic areas (e.g., current or expected weather conditions, anticipated or current power outages, or the like).

At step 224, external response data may be generated based on the retrieved data. At step 225, the generated external response data may be transmitted from the external data computing system 1 140 to the cognitive automation resource computing platform 110. In some examples, the external response data may be transmitted during the communication session initiated upon establishing the fourth wireless connection.

As an example, a bank branch may request information related to an upcoming storm that may impact the ability of staff to reach the bank branch location, impact customer needs, and the like. Accordingly, timing information, severity information, and the like, associated with the upcoming storm may be retrieved and provided for analysis.

Figure 2E:
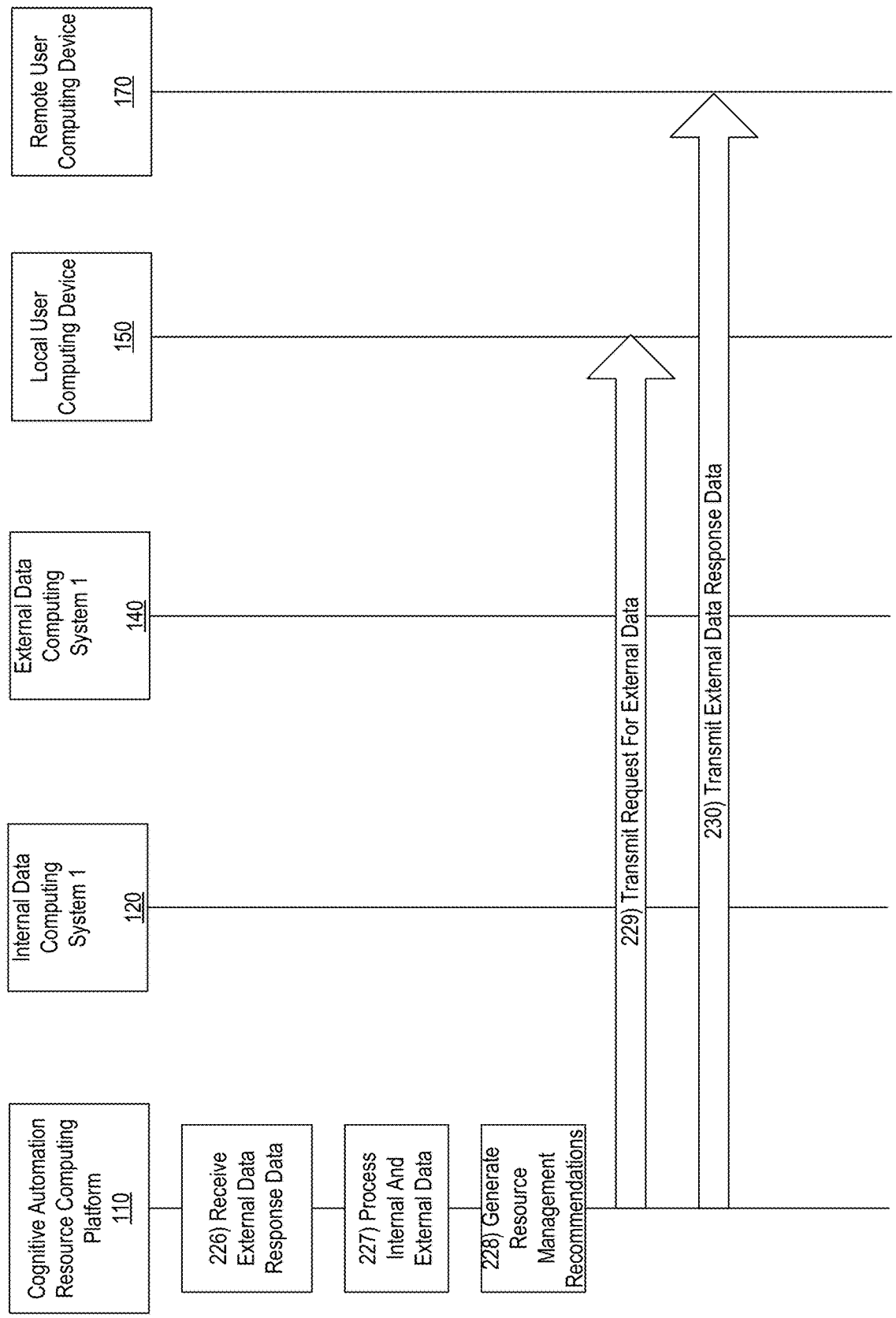

With reference to FIG. 2E, at step 226, the external response data may be received by cognitive automation resource computing platform. At step 227, the internal response data and external response data may be analyzed, e.g., using cognitive automation techniques.

At step 228, one or more resource management and control recommendations may be identified and/or generated using the cognitive automation model. For example, the internal response data and external response data may be compared to previously received and/or processed data to identify patterns, sequences, and the like. Based on the identified patterns, sequences, and the like, one or more recommendations may be identified. In some examples, cognitive automation resource computing platform 110 may compare internal data and external data to previously analyzed or received data to determine a number of matching points, a confidence level related to similarity between data, or the like, in order to identify and generate recommendations.

In some examples, the recommendations may include increasing staffing (e.g., calling in additional staff), decreasing staffing (e.g., sending home unnecessary staff), identifying additional staff having desired skills, identifying an alternate location to obtain products and services if a location is going to be closed, and the like.

At step 229 and 230, the generated recommendations may be transmitted to local user computing device 150 and remote user computing device 170, respectively. In some examples, the generated recommendations may be transmitted during a previously established communication session. In other examples, additional connections may be establishing and wireless communication session initiated in order to transmit the generated recommendations.

In some examples, the generated recommendations may include one or more notifications identifying the recommendation, indicating tasks or steps for implementing the recommendation, and the like. Additionally or alternatively, the recommendations may include commands, instructions or signals that may be executed by a receiving computing device to automatically implement one or more aspects of the recommendation. For instance, if additional staffing is desired and/or a person having a particular skill set is desired, the recommendation may include identification of the user and may automatically call or otherwise transmit a message requesting them to come in. In another example, if a power outage is ongoing in one area, the recommendation may include moving one or more computing processes hosted by devices in the outage area to an alternate or backup location and that modification may be automatically executed by one or more computing devices. Various other recommendations may be generated or identified without departing from the invention.

Figure 2F:
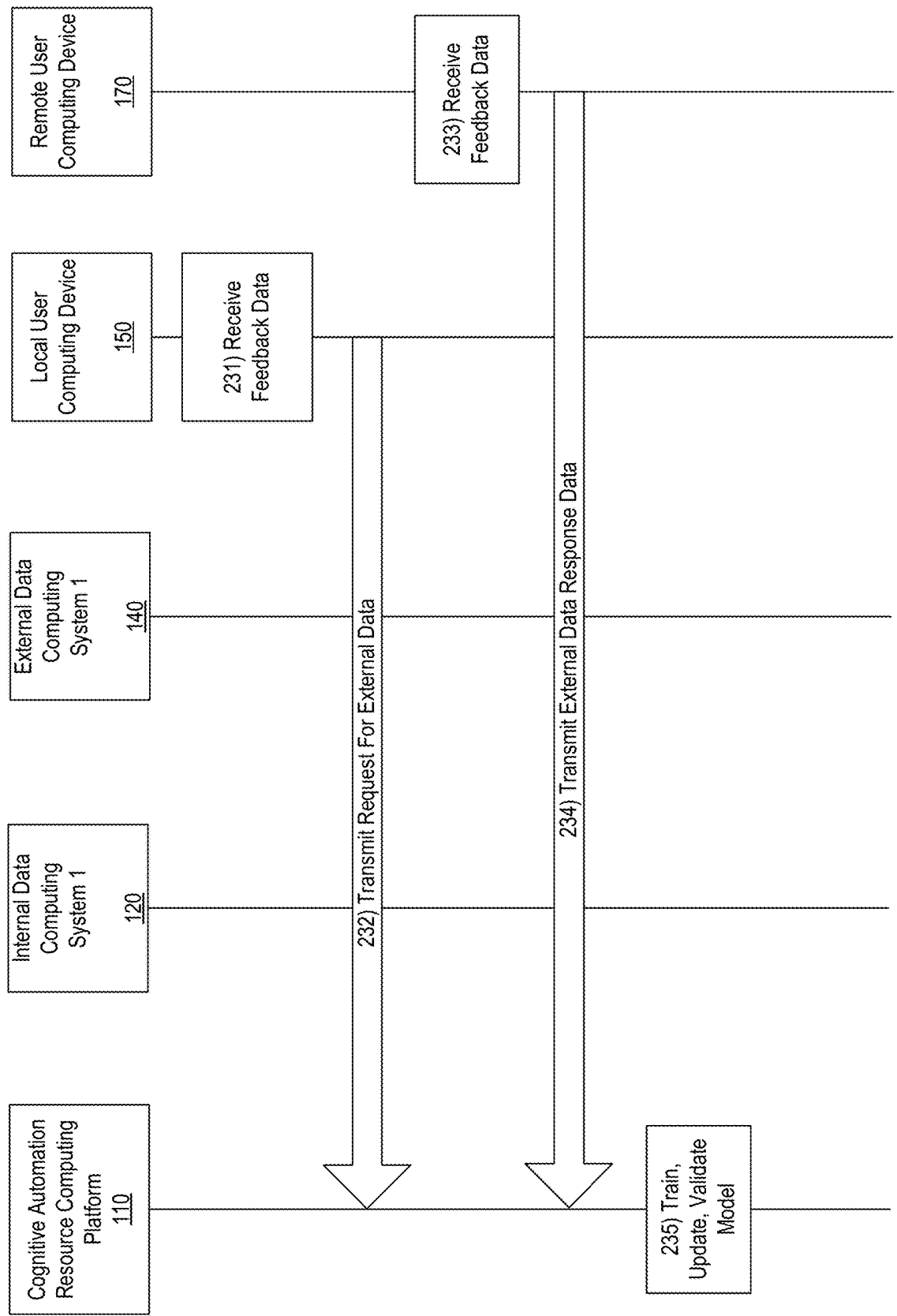

With reference to FIG. 2F, at step 231, feedback data may be received by local user computing device 150. For instance, after a recommendation has been transmitted to the local user computing device 150, user input may be received indicating whether the recommendation was implemented, results of the implementation, results of lack of implementation, and the like. In some examples, the recommendations transmitted may include interactive user interfaces enabling users to provide feedback information via touch input, voice input, or the like.

At step 232, the feedback data may be transmitted from the local user computing device 150 to the cognitive automation resource computing platform 110. In some examples, the feedback data may be transmitted during a previously establishing communication session. In other arrangements, additional wireless connections may be established and communication sessions initiated.

At step 233, feedback data may be received by remote user computing device 170. For instance, after a recommendation has been transmitted to the remote user computing device 170, user input may be received indicating whether the recommendation was implemented, results of the implementation, results of lack of implementation, and the like. In some examples, the feedback data may include response data from a user indicating that he or she is coming to work, cannot come to work, or the like. In some examples, the recommendations transmitted may include interactive user interfaces enabling users to provide feedback information via touch input, voice input, or the like.

At step 234, the feedback data may be transmitted from the remote user computing device 170 to the cognitive automation resource computing platform 110. In some examples, the feedback data may be transmitted during a previously establishing communication session. In other arrangements, additional wireless connections may be established and communication sessions initiated.

At step 235, the feedback data may be received by the cognitive automation resource computing platform and may be used to train, update and/or validate the cognitive automation model used to generated recommendations. Accordingly, the model may be continually being updated and refined to generate appropriate recommendations.

Figure 3:
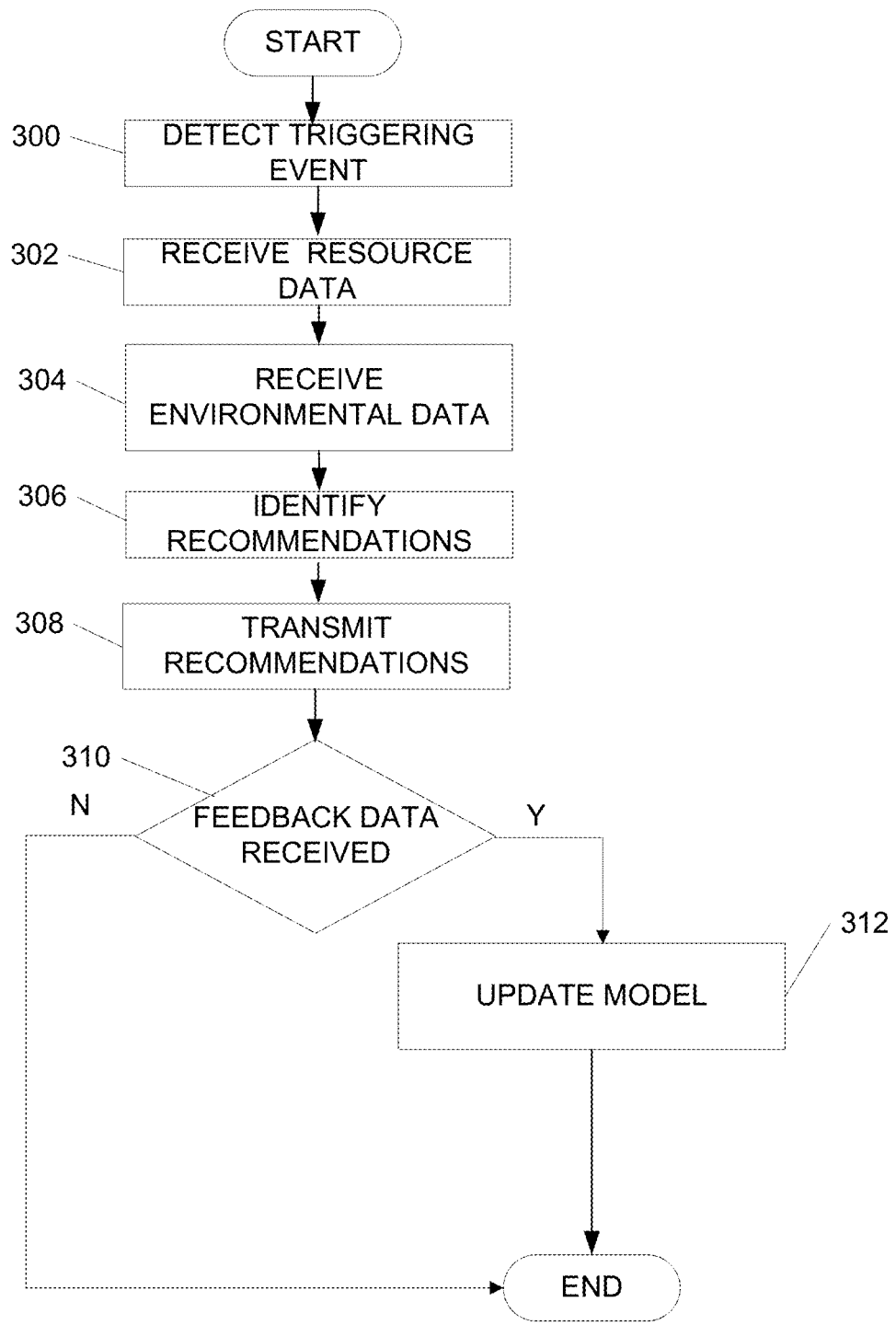
FIG. 3 depicts an illustrative method for implementing and using dynamic resource management and control functions according to one or more aspects described herein.

FIG. 3 is a flow chart illustrating one example method of implementing cognitive automation techniques to perform resource management and control functions according to one or more aspects described herein. The processes illustrated in FIG. 3 are merely some example processes and functions. The steps shown may be performed in the order shown, in a different order, more steps may be added, or one or more steps may be omitted, without departing from the invention. In some examples, one or more steps may be performed simultaneously with other steps shown and described.

At step 300, a triggering event may be detected. For instance, resource management and control functions may be triggered at a predetermined time, day, or the like. In other examples, resource management functions may be triggered upon expiration of a predetermined time period (e.g., 24 hours, 8 hours, or the like). In still other examples, resource management and control functions may be triggered at a start of a shift, or the like.

At step 302, resource data at a first entity location may be received. For instance, data associated with current resource (e.g., staffing, computer resource, or the like) levels may be received. In some examples, the data may be received in real-time. Further, data may be received from one or more user computing devices (e.g., remote user computing device 170, 175) such as a smartphone, smart watch or other wearable device, tablet, and the like. As discussed herein, the resource data may include an indication of detection of a signal emitted from a location beacon at a first entity location of a plurality of entity locations. Detection of the signal may indicate that the user computing device is within a predefined proximity of the location beacon in which the signal may be detected and, accordingly, may indicate a presence of the user device, and, thus, the user, at the first entity location.

At step 304, environmental data may be received (e.g., for a region or area near or around the first entity location). For instance, data associated with current and/or predicted environmental conditions may be received. The data may include current weather data, predicted weather data, power outage data, and the like. In some examples, the data may be publicly available data and may be received from one or more computing systems external to the entity.

At step 306, one or more resource recommendations or mitigating actions may be identified or generated using a cognitive automation model. For instance, the received resource and environmental data may be received and analyzed, using a cognitive automation model, to identify one or more resource recommendations to implement (e.g., at the first entity location). For instance, if a storm is approaching and staffing levels are low, the system may identify or generate a recommendation to bring in additional staff. Additionally or alternatively, if need for staff is also likely to be low because of the storm, a number of staff needed or identified to call in may be adjusted based on the anticipated needs of the first entity location.

At step 308, the generated recommendations may be transmitted to one or more computing devices. For instance, the recommendations may include a user interface identifying a predicted resource shortfall and identifying one or more actions to implement to mitigate impact of the predicted resource shortfall. Additionally or alternatively, the generated recommendations may include commands to instructions that may be automatically executed by a receiving device. For instance, the user interface may be automatically displayed, one or more computing processes may be automatically moved to an alternate processing location, one or more staff members may be automatically contacted (e.g., via phone, SMS, email, or the like) with a request to come to work, or the like. In some examples, the recommendations may include a request for feedback data (either user input or automatically provided by one or more computing devices or systems) related to implementation of the recommendations.

At step 310, a determination may be made as to whether feedback data base been received. For instance, a determination may be made as to whether a system provided an automated reply, a user provided input with respect to implementation of the recommendations, or the like. If not, the process may end.

If so, at step 312, the cognitive automation model may be updated, validated and/or trained based on the received feedback data. For instance, feedback data related to implementation of recommendations, outcome of implemented recommendations, and the like, may be provided and used to train, update and/or validate the cognitive automation model.

FIG. 4 illustrates one example user interface that may be generated in accordance with one or more aspects described herein. User interface 400 includes an indication that an entity location is likely to be short staffed and a recommendation to call in additional staff. In some examples, this recommendation may be transmitted to a local user computing device, such as local user computing device 150, 155 and displayed. A user may select "feedback" option to provide additional feedback (e.g., whether additional staff was called in, if people showed up, or the like).

FIG. 5 illustrates another example user interface that may be generated in accordance with one or more aspects described herein. User interface 500 includes a notification that may be transmitted to a user computing device, such as remote user computing device 170, 175. The user interface may include an indication of the recommendation and a request for feedback as to whether the person can come into work (e.g., "yes" option) or not (e.g., "no" option). The user may provide feedback by selecting an option and the feedback may be used to train, update and/or validate the cognitive automation model.

As discussed herein, aspects described relate to using cognitive automation techniques to provide resource management and control functions. For instance, staffing levels at one or more entity locations (e.g., bank branch, retail location, or the like) may vary due to unexpected absences of staff. This can lead to inefficiencies in the workplace and poor customer service. Accordingly, the arrangements described herein provide for a proactive evaluation of resources in order to generate recommendations to mitigate impact of potential issues.

For example, often when natural disasters (e.g., floods, tornadoes, hurricanes, blizzards, high winds, wide spread illness, or the like) occur, weather forecasts provide warnings in advance. In some examples, this advance notice may be processed, along with various resource levels at one or more entity locations, to evaluate whether sufficient resources are available at any particular location. For instance, if a storm is coming and staffing levels are low because people cannot get to work, additional workers may be called in to help to mitigate the impact of the unexpected absences.

In another example, if poor weather conditions are expected, the need for staff at a location may be reduced. Accordingly, the arrangements described herein may identify these scenarios and identify one or more staff members (e.g., based on skill set or other criteria) who may be given an option to leave work early.

Accordingly, the arrangements described herein may rely on historical data (e.g., baseline staffing needs per location, high capacity needs, low capacity needs, and the like) to identify an optimal number of staff in various situations based on the cognitive automation model.

In still another example, if a storm is expected and power outages are likely, the systems and arrangements described herein may identify these circumstances, identify one or more alternate locations at which customer may receive service, and transmit a notification to those customers to use the alternate location.

In yet another example, if network issues are occurring at a particular location, these scenarios may be identified using cognitive automation techniques and alternate locations for processing functions, providing service, and the like, may be identified, as well as appropriate modifications to staffing levels at the alternate location to accommodate the potential increase in customers or requested services.

In some arrangements, the publicly available information may include financial market or other data, such as interest rates, and the like. Accordingly, the system may monitor this data and upon detecting a triggering event (e.g., reduction in interest rates), may proactively assess resources needs at various locations to accommodate an expected increase in requests for services related to interest rates (e.g., increasing staff with experience in mortgages to handle potential increase in new mortgages, refinances, and the like).

The use of cognitive automation in these arrangements may enable pre-emptive staffing of locations, as well as mimicking human judgment and learning while processing vastly more inputs than a human would be able to process and in less time.

As discussed herein, one or more aspects of the arrangements described herein may be performed in real-time or near real-time. For instance, current resource and/or environmental data may be received in real-time or near real-time and analyzed (e.g., using cognitive automation techniques) in real-time or near real-time to generate recommendations.

In some examples, the systems and arrangements described herein may communicate with one or more user computing devices. For instance, one or more devices or systems described herein may communicate with a smartphone, smart watch or other wearable device, and the like, of a user. In some examples, the user may rely on the user computing device to provide time keeping or time entry input for the entity. For example, a user may clock in and clock out via a smart watch. This data may then be used to identify current resources within an entity location.

Although various aspects described herein are related to staffing levels at a location, the arrangements described herein may also be used to facilitate employee development, recruiting, and the like. For instance, cognitive automation techniques may be used to facilitate employee conversations (e.g., annual performance reviews, or the like), identify potential career development for employees, evaluate candidates for hire, and the like.

For example, the cognitive automation model described herein may be used to evaluate credentials of applicants, current employees, and the like, to identify candidates who may be a best fit for a position. For instance, the cognitive automation model may receive applicant data (e.g., resume and the like of applicants for the job) as well as other employee data (e.g., user profile and/or resume and the like of current employees (e.g., with permission of the employee to have their credentials considered for other roles with or without a user actively applying for the role)) and may analyze the data to identify patterns or sequences of users that are likely to succeed in a particular role the entity is looking to fill. The model may also evaluate the hiring criteria or skills sets desired or required for the position being filled and may evaluate potential applicants based on the criteria. In some examples, a user may build his or her profile and data may be extracted from the profile in the analysis. Accordingly, the system may identify hires that are more likely to be successful in the position.

In some examples, user profile data may include social media data of the user (e.g., with permission of the user). This information may be further used to evaluate the user for a potential role.

Evaluation of the user may be based on a quality of the inputs provided. For instance, a confidence score for one or more inputs may be determined (e.g., based on whether the data was provided by the user, was independently verified, or the like) and may be considered in evaluating the user for positions.

For example, a user may have position A in which they provide training for new hires in addition to performing various job functions requiring skills 1, 2, and 3. The entity may be looking to fill a role in position B that may require skills 1 and 3 and may involve providing coaching for other members of a team. The cognitive automation model may analyze the data based on these factors and may identify the user as a potential candidate for position B, either with or without the user actually applying for the job.

The use of cognitive automation in identifying candidates for hire may aid in identifying non-obvious links or skills of a user for a particular role. For instance, the use of cognitive automation may identify users who might not have a particular identified skill but have other skills that may be related, having similar learning curves, may predict users who have the capacity to learn well, and the like.

In another example, the arrangements described herein may be used to aid in employee development. For instance, feedback on employee performance may be provided to the system and the cognitive automation model may generate appropriate messaging to provide to the employee. For instance, key words may be identified by the model in the inputs provided (e.g., supervisor reviews, 360 reviews, and the like) and may be used to generate appropriate messaging for the employee. The appropriate messaging may include more standardized feedback to provide to the user without biases that may be provided in traditional review processes. The messaging may also include recommendations for improvement, praise for work well done, and the like. In addition to providing more standardized messaging, it may aid supervisors who might not be well skilled in delivering messages to users.

Use of cognitive automation in these systems may also aid in retaining employees. For instance, feedback provided by users in exit interviews may be analyzed and recommendations for improvement for the group, manager, or the like, may be generated.

In some examples, recordings of coaching sessions, annual reviews, exit interviews, and the like, may be analyzed using cognitive automation to generate recommendations. For instance, with permission of those being recorded, conversations may be recorded and analyzed (e.g., using natural language processing) to detect tone, length of conversation, and the like. This data may be further analyzed to identify and/or generate recommendations (e.g., messaging, and the like).

Arrangements described herein may be used to track employee performance and generate or modify a development plan for the employee based on performance. For instance, as items on a development plan or tasks assigned to an employee are completed, the system may evaluate the completion, as well as input provided about the employee, to identify or validate one or more next steps in the development plan. This may also be used to compare employees within a group to identify strong performers, performers needed development, and the like.

Employee development and coaching aspects may be performed across an enterprise to provide more standardized evaluation of employees for promotions, consideration for new jobs, salary adjustments, and the like. Further, by evaluating employees across an enterprise, long term recommendations may be made. For instance, as a particular role may be phased out, employees who, historically, would have transitioned into the role being phased out may be identified and one or more skills to develop may be recommended, alternate job positions may be recommended, modifications to the development plan of the employee may be generated, and the like.

Figure 6:
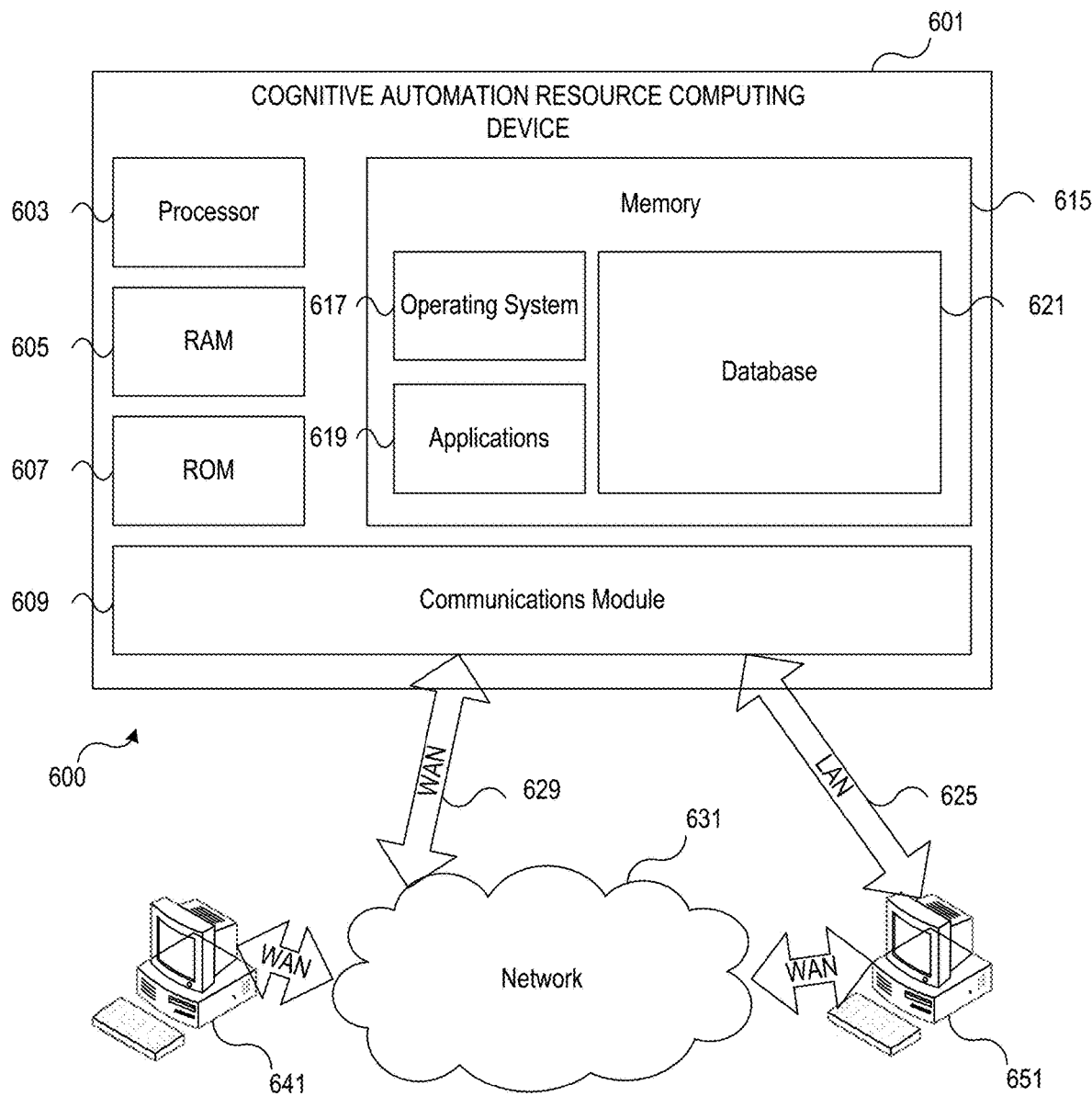
FIG. 6 illustrates one example environment in which various aspects of the disclosure may be implemented in accordance with one or more aspects described herein.

FIG. 6 depicts an illustrative operating environment in which various aspects of the present disclosure may be implemented in accordance with one or more example embodiments. Referring to FIG. 6, computing system environment 600 may be used according to one or more illustrative embodiments. Computing system environment 600 is only one example of a suitable computing environment and is not intended to suggest any limitation as to the scope of use or functionality contained in the disclosure. Computing system environment 600 should not be interpreted as having any dependency or requirement relating to any one or combination of components shown in illustrative computing system environment 600.

Computing system environment 600 may include cognitive automation resource computing device 601 having processor 603 for controlling overall operation of cognitive automation resource computing device 601 and its associated components, including Random Access Memory (RAM) 605, Read-Only Memory (ROM) 607, communications module 609, and memory 615. Cognitive automation resource computing device 601 may include a variety of computer readable media. Computer readable media may be any available media that may be accessed by cognitive automation resource computing device 601, may be non-transitory, and may include volatile and nonvolatile, removable and non-removable media implemented in any method or technology for storage of information such as computer-readable instructions, object code, data structures, program modules, or other data. Examples of computer readable media may include Random Access Memory (RAM), Read Only Memory (ROM), Electronically Erasable Programmable Read-Only Memory (EEPROM), flash memory or other memory technology, Compact Disk Read-Only Memory (CD-ROM), Digital Versatile Disk (DVD) or other optical disk storage, magnetic cassettes, magnetic tape, magnetic disk storage or other magnetic storage devices, or any other medium that can be used to store the desired information and that can be accessed by cognitive automation resource computing device 601.

Although not required, various aspects described herein may be embodied as a method, a data transfer system, or as a computer-readable medium storing computer-executable instructions. For example, a computer-readable medium storing instructions to cause a processor to perform steps of a method in accordance with aspects of the disclosed embodiments is contemplated. For example, aspects of method steps disclosed herein may be executed on a processor on cognitive automation resource computing device 601. Such a processor may execute computer-executable instructions stored on a computer-readable medium.

Software may be stored within memory 615 and/or storage to provide instructions to processor 603 for enabling cognitive automation resource computing device 601 to perform various functions as discussed herein. For example, memory 615 may store software used by cognitive automation resource computing device 601, such as operating system 617, application programs 619, and associated database 621. Also, some or all of the computer executable instructions for cognitive automation resource computing device 601 may be embodied in hardware or firmware. Although not shown, RAM 605 may include one or more applications representing the application data stored in RAM 605 while cognitive automation resource computing device 601 is on and corresponding software applications (e.g., software tasks) are running on cognitive automation resource computing device 601.

Communications module 609 may include a microphone, keypad, touch screen, and/or stylus through which a user of cognitive automation resource computing device 601 may provide input, and may also include one or more of a speaker for providing audio output and a video display device for providing textual, audiovisual and/or graphical output. Computing system environment 600 may also include optical scanners (not shown).

Cognitive automation resource computing device 601 may operate in a networked environment supporting connections to one or more remote computing devices, such as computing devices 641 and 651. Computing devices 641 and 651 may be personal computing devices or servers that include any or all of the elements described above relative to cognitive automation resource computing device 601.

The network connections depicted in FIG. 6 may include Local Area Network (LAN) 625 and Wide Area Network (WAN) 629, as well as other networks. When used in a LAN networking environment, cognitive automation resource computing device 601 may be connected to LAN 625 through a network interface or adapter in communications module 609. When used in a WAN networking environment, cognitive automation resource computing device 601 may include a modem in communications module 609 or other means for establishing communications over WAN 629, such as network 631 (e.g., public network, private network, Internet, intranet, and the like). The network connections shown are illustrative and other means of establishing a communications link between the computing devices may be used. Various well-known protocols such as Transmission Control Protocol/Internet Protocol (TCP/IP), Ethernet, File Transfer Protocol (FTP), Hypertext Transfer Protocol (HTTP) and the like may be used, and the system can be operated in a client-server configuration to permit a user to retrieve web pages from a web-based server.

Figure 7:
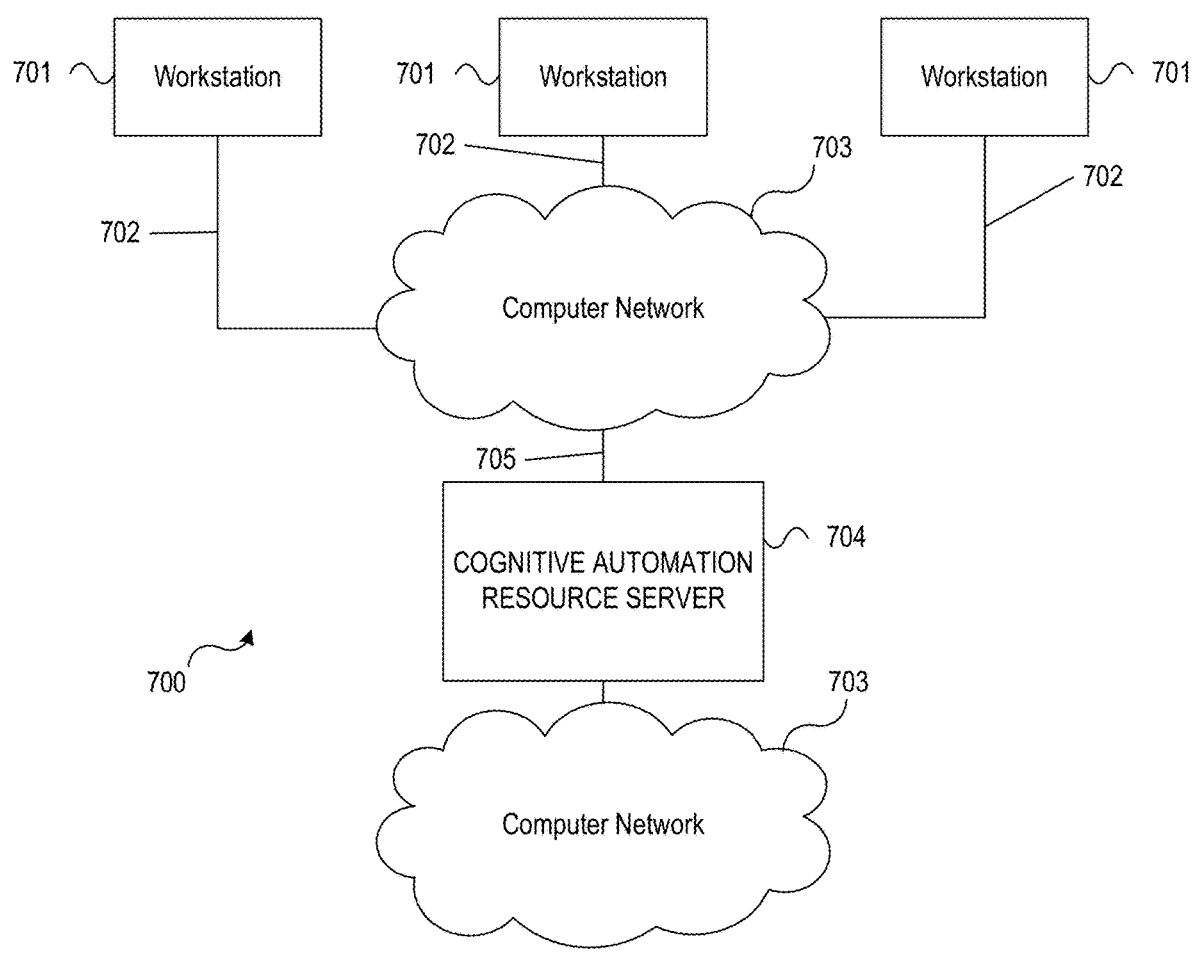
FIG. 7 depicts an illustrative block diagram of workstations and servers that may be used to implement the processes and functions of certain aspects of the present disclosure in accordance with one or more aspects described herein.

FIG. 7 depicts an illustrative block diagram of workstations and servers that may be used to implement the processes and functions of certain aspects of the present disclosure in accordance with one or more example embodiments. Referring to FIG. 7, illustrative system 700 may be used for implementing example embodiments according to the present disclosure. As illustrated, system 700 may include one or more workstation computers 701. Workstation 701 may be, for example, a desktop computer, a smartphone, a wireless device, a tablet computer, a laptop computer, and the like, configured to perform various processes described herein. Workstations 701 may be local or remote, and may be connected by one of communications links 702 to computer network 703 that is linked via communications link 705 to cognitive automation resource server 704. In system 700, cognitive automation resource server 704 may be a server, processor, computer, or data processing device, or combination of the same, configured to perform the functions and/or processes described herein. Server 704 may be used to receive resource data, receive environmental data, identify resource recommendations using cognitive automation techniques, transmit generated recommendations, receive feedback data, update a cognitive automation model, and the like.

Computer network 703 may be any suitable computer network including the Internet, an intranet, a Wide-Area Network (WAN), a Local-Area Network (LAN), a wireless network, a Digital Subscriber Line (DSL) network, a frame relay network, an Asynchronous Transfer Mode network, a Virtual Private Network (VPN), or any combination of any of the same. Communications links 702 and 705 may be communications links suitable for communicating between workstations 701 and dynamic data transformation server 504, such as network links, dial-up links, wireless links, hard-wired links, as well as network types developed in the future, and the like.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, Application-Specific Integrated Circuits (ASICs), Field Programmable Gate Arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, one or more steps described with respect to one figure may be used in combination with one or more steps described with respect to another figure, and/or one or more depicted steps may be optional in accordance with aspects of the disclosure.

What is claimed is:

1. A computing platform, comprising:
   at least one processor;
   a communication interface communicatively coupled to the at least one processor; and
   a memory storing computer-readable instructions that, when executed by the at least one processor, cause the computing platform to:

receive, in real-time, current resource data for a first entity location of a plurality of entity locations, receiving the current resource data including:
   scanning the first entity location to identify current staffing levels at the first entity location, the scanning including transmitting a signal to be detected by staff computing devices within a predetermined distance of a location beacon at the first entity location emitting the signal;
   receiving, from one or more staff computing devices associated with present staff, acknowledgment, of detection of the signal emitted from the location beacon at the first entity location by the one or more staff computing devices;
   identifying, based on the scanning and the acknowledgement, expected staff who are not present at the first entity location;
receive data related to environmental conditions at the first entity location;
identify, by a cognitive automation model trained to recognize data patterns and based on the current resource data and data related to environmental conditions, a resource recommendation for the first entity location, the resource recommendation including at least transferring one or more computer processing functions hosted by entity computing devices at the first entity location to entity computing devices at a second entity location and modifying staffing levels at the second entity location;
generate a user interface including the identified resource recommendation;
generate an instruction to automatically execute the identified resource recommendation;
transmit the generated user interface and the generated instruction to automatically execute the identified resource recommendation to a computing device;
automatically cause execution of one or more actions by the computing device based on the transmitted instruction to automatically execute the identified resource recommendation, the one or more actions including at least the transferring the one or more computer processing functions hosted by entity computing devices at the first entity location to entity computing devices at the second entity location, transmitting a first notification to one or more staff computing devices indicating the modified staffing levels at the second entity location, transmitting a second notification to one or more customer computing devices identifying available service at the second entity location, and automatically displaying the user interface identifying the identified resource recommendation;
receive, from the computing device, feedback data; and
update, based on the feedback data, the cognitive automation model.

2. The computing platform of claim 1, wherein the identified resource recommendation further includes a recommendation to increase staffing and wherein the computing device is a computing device of a staff member and wherein transmitting the identified resource recommendation includes transmitting a request for the staff member to come to work.

3. The computing platform of claim 1, wherein the data related to environmental conditions includes at least one of: current weather conditions, predicted weather conditions, or power outage data.

4. The computing platform of claim 1, wherein identifying the resource recommendation includes identifying the second entity location of the plurality of entity locations to perform functions of the first entity location.

5. A method, comprising:
receiving, in real-time and by a computing platform, current resource data for a first entity location of a plurality of entity locations, receiving the current resource data including:
   scanning the first entity location to identify current staffing levels at the first entity location, the scanning including transmitting a signal to be detected by user computing devices within a predetermined distance of a location beacon at the first entity location emitting the signal;
   receiving, from one or more staff computing devices, acknowledgment, of detection of the signal emitted from the location beacon at the first entity location by the one or more staff computing devices;
   identifying, based on the scanning and the acknowledgement, expected staff who are not present at the first entity location;
receiving, by the computing platform, data related to environmental conditions at the first entity location;
identifying, by the computing platform, using a cognitive automation model trained to recognize data patterns and based on the current resource data and data related to environmental conditions, a resource recommendation for the first entity location, the resource recommendation including at least transferring one or more computer processing functions hosted by entity computing devices at the first entity location to entity computing devices at a second entity location and modifying staffing levels at the second entity location;
generating, by the computing platform, a user interface including the identified resource recommendation;
generating, by the computing platform, an instruction to automatically execute the identified resource recommendation;
transmitting, by the computing platform, the generated user interface and the generated instruction to automatically execute the identified resource recommendation to a computing device;
automatically causing, by the computing platform, execution of one or more actions by the computing device based on the transmitted instruction to automatically execute the identified resource recommendation, the one or more actions including at least the transferring the one or more computer processing functions hosted by entity computing devices at the first entity location to entity computing devices at the second entity location, transmitting a first notification to one or more staff computing devices indicating the modified staffing levels at the second entity location, transmitting a second notification to one or more customer computing devices identifying available service at the second entity location, and automatically displaying the user interface identifying the identified resource recommendation;
receiving, by the computing platform and from the computing device, feedback data; and
updating, by the computing platform and based on the feedback data, the cognitive automation model.

6. The method of claim 5, wherein the identified resource recommendation further includes a recommendation to increase staffing and wherein the computing device is a computing device of a staff member and wherein transmitting the identified resource recommendation includes transmitting a request for the staff member to come to work.

7. The method of claim 5, wherein the data related to environmental conditions includes at least one of: current weather conditions, predicted weather conditions, or power outage data.

8. The method of claim 5, wherein identifying the resource recommendation includes identifying the second entity location of the plurality of entity locations to perform functions of the first entity location.

9. One or more non-transitory computer-readable media storing instructions that, when executed by a computing platform comprising at least one processor, memory, and a communication interface, cause the computing platform to:
   receive, in real-time, current resource data for a first entity location of a plurality of entity locations, receiving the current resource data including:
      scanning the first entity location to identify current staffing levels at the first entity location, the scanning including transmitting a signal to be detected by staff computing devices within a predetermined distance of a location beacon at the first entity location emitting the signal;
      receiving, from one or more staff computing devices associated with present staff, acknowledgment of detection of the signal emitted from the location beacon at the first entity location by the one or more staff computing devices;
      identifying, based on the scanning and the acknowledgement, expected staff who are not present at the first entity location;
   receive data related to environmental conditions at the first entity location;
   identify, by a cognitive automation model trained to recognize data patterns and based on the current resource data and data related to environmental conditions, a resource recommendation for the first entity location, the resource recommendation including at least transferring one or more computer processing functions hosted by entity computing devices at the first entity location to entity computing devices at a second entity location and modifying staffing levels at the second entity location;
   generate a user interface including the identified resource recommendation;
   generate an instruction to automatically execute the identified resource recommendation;
   transmit the generated user interface and the generated instruction to automatically execute the identified resource recommendation to a computing device;
   automatically cause execution of one or more actions by the computing device based on the transmitted instruction to automatically execute the identified resource recommendation, the one or more actions including at least the transferring the one or more computer processing functions hosted by entity computing devices at the first entity location to entity computing devices at the second entity location, transmitting a first notification to one or more staff computing devices indicating the modified staffing levels at the second entity location, transmitting a second notification to one or more customer computing devices identifying available service at the second entity location, and automatically displaying the user interface identifying the identified resource recommendation;
   receive, from the computing device, feedback data; and
   update, based on the feedback data, the cognitive automation model.

10. The one or more non-transitory computer-readable media of claim 9, wherein the identified resource recommendation further includes a recommendation to increase staffing and wherein the computing device is a computing device of a staff member and wherein transmitting the identified resource recommendation includes transmitting a request for the staff member to come to work.

11. The one or more non-transitory computer-readable media of claim 9, wherein the data related to environmental conditions includes at least one of: current weather conditions, predicted weather conditions, or power outage data.

12. The one or more non-transitory computer-readable media of claim 9, wherein identifying the resource recommendation includes identifying the second entity location of the plurality of entity locations to perform functions of the first entity location.

* * * * *